United States Patent
Han

(10) Patent No.: US 7,411,343 B2
(45) Date of Patent: Aug. 12, 2008

(54) INORGANIC ELECTROLUMINESCENT DEVICE

(75) Inventor: In-taek Han, Seoul (KR)

(73) Assignee: Samsung SDI Co., Ltd., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 10/734,136

(22) Filed: Dec. 15, 2003

(65) Prior Publication Data

US 2004/0174117 A1    Sep. 9, 2004

(30) Foreign Application Priority Data

Dec. 24, 2002    (KR)    .................. 10-2002-0083185

(51) Int. Cl.
*H05B 33/20* (2006.01)
*H05B 33/14* (2006.01)
*H01L 51/50* (2006.01)

(52) U.S. Cl. .................. 313/503; 313/506; 313/509; 428/690; 428/917

(58) Field of Classification Search .................. 313/503, 313/506, 509; 428/690, 917
See application file for complete search history.

(56) References Cited

U.S. PATENT DOCUMENTS

| | | | |
|---|---|---|---|
| 4,416,933 A * | 11/1983 | Antson et al. ................ | 428/216 |
| 4,748,375 A * | 5/1988 | Lindmayer .................. | 313/509 |
| 4,897,319 A * | 1/1990 | Sun ............................. | 428/690 |
| 5,543,237 A | 8/1996 | Waanabe | |
| 5,641,181 A | 6/1997 | Galhotra | |
| 6,921,575 B2 * | 7/2005 | Horiuchi et al. ............. | 428/367 |
| 2004/0206942 A1 * | 10/2004 | Hsu ........................... | 252/500 |

FOREIGN PATENT DOCUMENTS

| | | |
|---|---|---|
| EP | 1022931 A | 7/2000 |
| EP | 1244335 A | 9/2002 |
| JP | 11233265 A | 8/1999 |
| JP | 2000173780 A | 6/2000 |
| JP | 2002305087 A | 10/2002 |

OTHER PUBLICATIONS

A.G. Fischer, "Electroluminescent II-VI Heterojunctions", Journal of the Electrochemical society, Reviews and News, Jun. 1971, pp. 139c-144c, Electrochemical Society.
Chinese Office Action (Appln. No. 200310123723.2) with English Language Translation dated Jun. 29 2007.

* cited by examiner

*Primary Examiner*—Nimeshkumar D. Patel
*Assistant Examiner*—Anne M Hines
(74) *Attorney, Agent, or Firm*—Buchanan Ingersoll & Rooney PC

(57) ABSTRACT

An electroluminescent device is provided. The device has a stacked structure in which an electric field enhancing layer is present between a dielectric layer, which contacts an inorganic light-emitting layer, and an electrode. In the device, electrons are additionally supplied by the electric field enhancing layer to increase electroluminescent efficiency, enabling the device to emit light having desired brightness, and lengthening the life span of the device.

5 Claims, 5 Drawing Sheets

INORGANIC ELECTROLUMINESCENT DEVICE

BACKGROUND OF THE INVENTION

This application claims the priority of Korean Patent Application No. 2002-83185 filed Dec. 24, 2002 in the Korean Intellectual Property Office, the disclosure of which is incorporated herein in its entirety by reference.

1. Field of the Invention

The present invention relates to an inorganic electroluminescent device, and more particularly, to an inorganic electroluminescent device having high luminous efficiency.

2. Description of the Related Art

A typical stacked structure of an inorganic electroluminescent device is disclosed in U.S. Pat. Nos. 5,543,237 and 5,641,181.

An inorganic electroluminescent device having such a typical stacked structure is illustrated in FIG. 1. Referring to FIG. 1, this device has a stacked structure in which a transparent indium tin oxide (ITO) electrode 2 is formed on a substrate 1 and a first dielectric layer 3 is formed on the ITO electrode 2. An inorganic electroluminescent layer 4, a second dielectric layer 5, and a back electrode are sequentially formed on the first dielectric layer 3. Also, a protective layer (not shown) is formed on the back electrode 6 to protect the stacked structure from the outside.

An inorganic electroluminescent device is driven by an AC voltage which creates a strong alternating electric field in which electrons accelerate and collide with a fluorescent substance. In order to obtain high luminance, a large number of electrons are required.

Here, it is desirable to develop an inorganic electroluminescent device that has a high luminous efficiency and can be driven by a low voltage.

SUMMARY OF THE INVENTION

The present invention provides an inorganic electroluminescent device that has a high luminous efficiency and can be driven by a lower voltage.

According to an aspect of the present invention, there is provided an inorganic electroluminescent device comprising a substrate, a transparent electrode which is formed on the substrate, an inorganic light-emitting layer which is formed on the electrode, a dielectric layer which is formed on the inorganic light-emitting layer, and a back electrode which is formed on the dielectric layer, wherein an electric field enhancing layer is present between the dielectric layer and the back electrode.

It is preferable that the electric field enhancing layer is formed of carbon nano tubes or nano particles.

According to another aspect of the present invention, there is provided an inorganic electroluminescent layer comprising an inorganic light-emitting layer; upper and lower dielectric layers which are formed above and below the light-emitting layer, respectively, and form a sandwich structure together with the light-emitting layer; upper and lower electrodes which are formed above and below the sandwich structure, respectively; a substrate which is a main frame of the above stacked structures, wherein an electric field enhancing layer is present at at least one of an interface between the upper electrode and the upper dielectric layer which contacts the upper electrode, and an interface between the lower electrode and the lower dielectric layer which contacts the lower electrode.

It is preferable that the electric field enhancing layer is formed of carbon nano tubes.

According to still another aspect of the present invention, there is provided an inorganic electroluminescent device comprising first and second substrates which are arranged opposite to each other, a transparent electrode which is formed on the first substrate, an inorganic light-emitting layer which is formed on the transparent layer, a dielectric layer which is formed on the light-emitting layer, a back electrode which is formed on the second substrate, and an electric field enhancing layer which is formed on the back electrode so as to contact the dielectric layer on the first substrate.

It is preferable that the transparent electrode, the inorganic light-emitting layer, and the dielectric layer are formed on the first substrate and the back electrode and the electric field enhancing layer are formed on the second substrate. Also, it is preferable that the electric field enhancing layer is formed of carbon nano tubes.

According to still another aspect of the present invention, there is provided an inorganic electroluminescent layer comprising first and second substrates which are arranged opposite to each other, a transparent electrode which is formed on the first substrate, a first electric field enhancing layer which is formed on the transparent electrode, a first dielectric layer which is formed on the transparent electrode, a back electrode which is formed on the second substrate, a second electric field enhancing layer which is formed on the second substrate so as to contact the dielectric layer on the first substrate, a second dielectric layer which is formed on the second electric field enhancing layer, and an inorganic light-emitting layer which is present between the first and second dielectric layers.

It is preferable that the transparent electrode, the first electric field enhancing layer, the first dielectric layer, the inorganic light-emitting layer, and the second dielectric layer are formed on the first substrate and the back electrode and the electric field enhancing layer are formed on the second substrate.

BRIEF DESCRIPTION OF THE DRAWINGS

The above and other aspects and advantages of the present invention will become more apparent by describing in detail preferred embodiments thereof with reference to the accompanying drawings in which.

DETAILED DESCRIPTION OF THE INVENTION

Hereinafter, preferred embodiments of the present invention will be explained in detail with reference to the accompanying drawings. However, well-known methods of and materials for manufacturing structures according to the following embodiments will not be described in great detail.

First Embodiment

Figure 1:
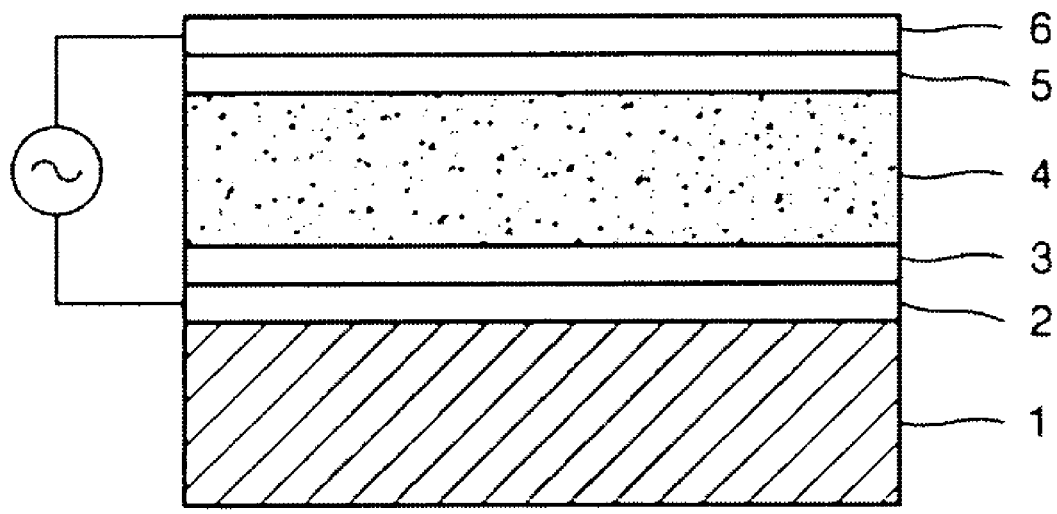
FIG. 1 is a schematic cross-sectional view of a conventional inorganic electroluminescent device.
Figure 2:
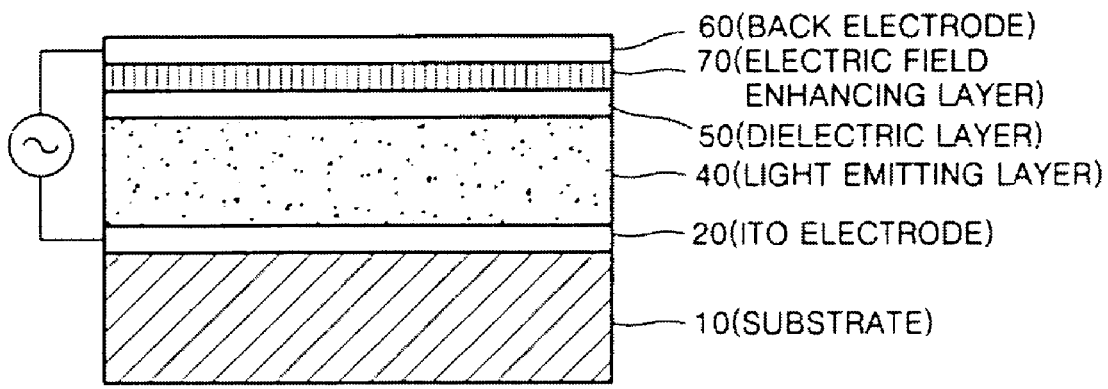
FIG. 2 is a schematic cross-sectional view of an inorganic electroluminescent device having a stacked structure, according to a first embodiment of the present invention.

Referring to FIG. 2, an inorganic electroluminescent device according to a first embodiment of the present invention has a stacked structure in which a transparent electrode 20, which is formed of transparent indium tin oxide (ITO), is formed on a substrate 10, and an inorganic light-emitting layer 40, in which electric field enhancement occurs, is formed on the ITO electrode 20. Also, a dielectric layer 50 and a back electrode are sequentially formed on the light-emitting layer 40, and an electric field enhancing layer 70, which characterizes the present invention, is present between the dielectric layer 50 and the back electrode 60. A protective layer (not shown) is formed on the back electrode 60 to shield the stacked structure from the outside. In the first embodiment, it is preferable that the electric field enhancing layer 70 is formed of carbon nano tubes, since it is not positioned adjacent to the substrate 10 through which light passes.

Second Embodiment

Figure 3:
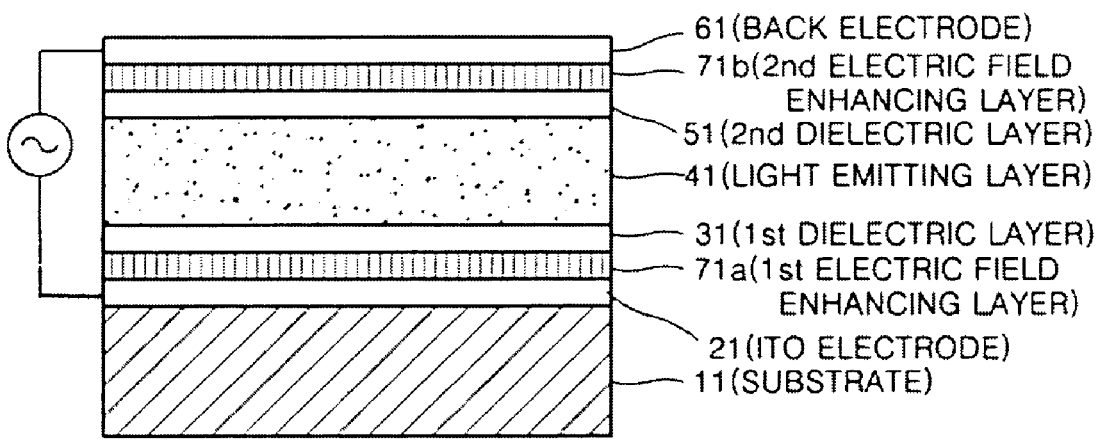
FIG. 3 is a schematic cross-sectional view of an inorganic electroluminescent device having a stacked structure, according to a second embodiment of the present invention.

Referring to FIG. 3, an inorganic electroluminescent device according to a second embodiment has a stacked structure in which a transparent electrode 21, which is formed of transparent ITO, and a first electric field enhancing layer 71a, which characterizes the present invention, are sequentially formed on a substrate 11. A first dielectric layer 31 is formed on the first electric field enhancing layer 71a and an inorganic light-emitting layer 41, in which electric field enhancement occurs, is formed on the first dielectric layer 31. Also, a second dielectric layer 51 and a back electrode 61 are sequentially formed on the light-emitting layer 41, and a second electric field enhancing layer 71b, which also is another aspect of the present invention, are present between the second dielectric layer 51 and the back electrode 61. Further, a protective layer (not shown) is formed on the back electrode 61 to shield the stacked structure from the outside. In the second embodiment, it is preferable that the first electric field enhancing layer is formed of a transparent material, since it is formed adjacent to the substrate 11 through which light passes.

Third Embodiment

Figure 4:
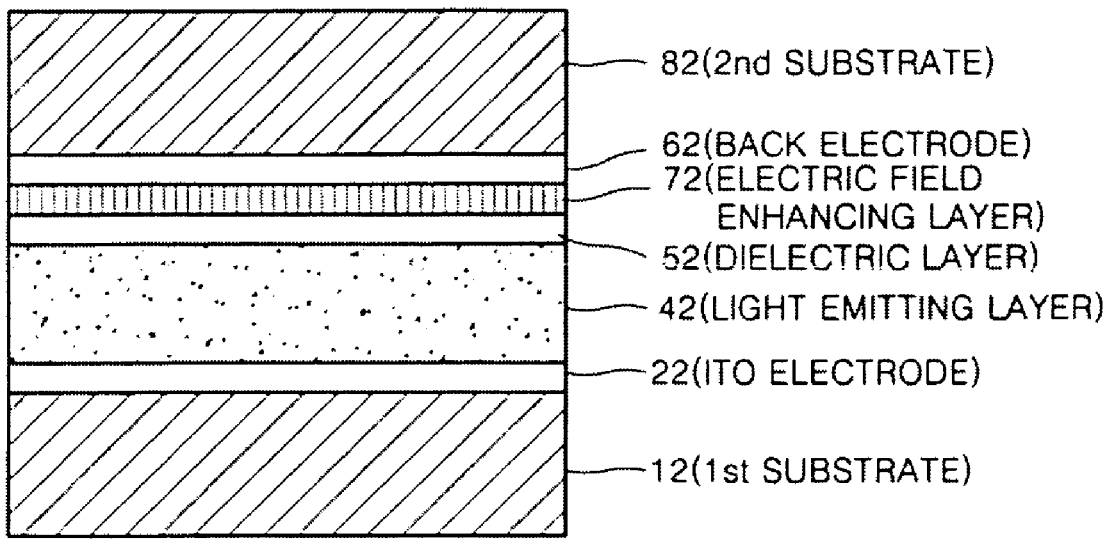
FIG. 4 is a schematic cross-sectional view of an inorganic electroluminescent device having a stacked structure, according to a third embodiment of the present invention.

Referring to FIG. 4, an inorganic electroluminescent device according to a third embodiment has a stacked structure in which a sandwich structure, in which electric field enhancement occurs, is present between a first substrate 12 and a second substrate 82. More specifically, a transparent electrode 22, which is formed of transparent ITO, is formed on the first substrate 12 and an inorganic light-emitting layer 42, in which electric field enhancement occurs, is formed on the ITO electrode 22. A dielectric layer 51 and a back electrode 42 are sequentially deposited on the light-emitting layer 42, and an electric field enhancing layer 72, which is another aspect of the present invention, is present between the dielectric layer 52 and the back electrode 62. It is preferable that the ITO electrode 22, the light-emitting layer 42, and the dielectric layer 52 are sequentially formed on the first substrate 12, and the back electrode 62 and the electric field enhancing layer 72 are sequentially formed on the second substrate 82. Next, the first substrate 12 is combined with the second substrate 82 in order that the dielectric layer 52 on the first substrate 12 contacts the electric field enhancing layer 72 of the second substrate 82.

Fourth Embodiment

Figure 5:
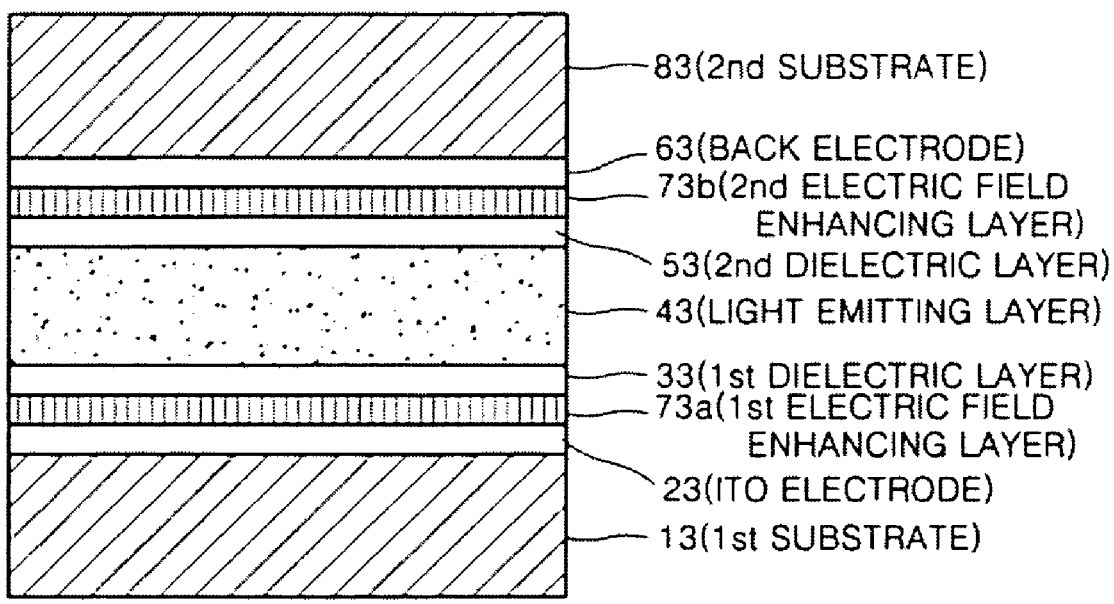
FIG. 5 is a schematic cross-sectional view of an inorganic electroluminescent device having a stacked structure, according to a fourth embodiment of the present invention.

Referring to FIG. 5, an inorganic electroluminescent device according to a fourth embodiment has a stacked structure in which a sandwich structure is present between a first substrate 13 and a second substrate 83, as shown in the electroluminescent device of FIG. 4. More specifically, a transparent electrode 23, which is formed of transparent ITO, is formed on the first substrate 13, and a first electric field enhancing layer 73a, a first dielectric layer 33, and an inorganic light-emitting layer 43, in which electric field enhancement occurs, are sequentially formed on the ITO electrode 23. A second dielectric layer 53, a second electric field enhancing layer 73b, and a back electrode 62 are sequentially formed on the light-emitting layer 43. It is preferable that the ITO electrode 23, the first electric field enhancing layer 73a, the first dielectric layer 33, the light-emitting layer 43, and the second dielectric layer 53 are sequentially formed on the first substrate 13. Also, the back electrode 63 and the second electric field enhancing layer 73b are sequentially formed on the second substrate 83. Next, the first substrate 13 is combined with the second substrate 83 so that the second dielectric layer 53 of the first substrate 13 contacts the second electric field enhancing layer 73b. In the fourth embodiment, the first electric field enhancing layer 73a is formed adjacent to the first substrate 13 through which light passes. Thus, it is preferable that the first electric field enhancing layer 73a is formed of transparent nano particles. In contrast, the second electric field enhancing layer 73b does not stand in the way of light and thus may be formed of carbon nano tubes or some other non-transparent material.

As mentioned above, an electroluminescent device according to the present invention is characterized in that an electric field enhancing layer is formed on an electrode contacting a dielectric layer. The electric field enhancing layer may be formed of carbon nano tubes or micro particles that have electric field enhancing characteristics.

In an inorganic electroluminescent device according to the present invention, when alternating current (AC) voltage is applied to a transparent ITO electrode and a back electrode, a strong electric field on the order of MV/cm is generated at an end of the electroluminescent device, and electrons, which are trapped at an interface between a dielectric layer and an inorganic light-emitting layer, are emitted therefrom. Here, electrons tunnel through a conduction band of the light-emitting layer. The electrons emitted into the conduction band of the light-emitting layer, accelerate in the electric field to obtain enough energy to excite the center of radiation of the fluorescent substance. Then, the electrons collide with peripheral electrons at the center of radiation to excite the peripheral electrons. The excited electrons, which were at a ground state, return to the ground state and as a result, light emission occurs by energy difference between two states. There is a possibility that some high-energy electrons may get knocked out of the fluorescent substance and then this substance is partially ionised to emit secondary electrons. Meanwhile, some lower energy electrons, including electrons that have lost most of their energy by collision or emission of radiation, may get trapped by the interface between the ITO electrode and the back electrode. When the polarity of the outer voltage changes, the above process is reversed. According to Fisher's principles (refer to Journal of the Electrochemical Society: Review and News, June 1971), the distance between a light-emitting layer and a dielectric layer is just several nm, that is, they are in pseudo-contact with each other. Therefore, electrons emitted from the light-emitting layer, i.e., an acute edge of a fluorescent device, are combined with holes, which are generated when voltage having opposite polarity is applied, and radiate light. In this case, the amount of holes is equivalent to that of electrons which are generated at the opposite electrode. Accordingly, the more electrons are formed at the opposite electrode, the more holes are combined with the electrons to radiate more light, i.e., the higher luminous efficiency. According to embodiments of the present invention, the surface of an electrode which contacts a dielectric layer is coated with a field-emission layer formed of a material having field-emission characteristics, e.g., carbon nano tubes or nano particles. Here, since the distance between the field emission layer and the dielectric layer is just several nm, field emission occurs between the field-emission layer and the dielectric layer to generate electrons. The generated electrons are supplied to the dielectric layer. The field emission may occur in a material having fine pores or gaps which allow electrons to penetrate. This means that the dielectric layer is in pseudo contact with the field-emission layer or fine pores or gaps are present between the dielectric layer and the field-emission layer. The supply of additional electrons increases luminous efficiency and further enables an electroluminescent device to operate at low voltage and have a high brightness.

Embodiments of the present invention are based on the electrical state of an electrode contacting a dielectric layer. Assuming that two opposite electrodes have the same amount of electric charges, when a high electric field is applied to the dielectric layer in order to form many electrons or holes at a surface of the dielectric layer contacting a light-emitting layer, many holes or electrons are formed at the other surface of the dielectric layer. As mentioned above, a surface of the electrode contacting the dielectric layer is coated with a field-emission material such as carbon nano tubes or nano particles. Therefore, with the distance between the field-emission layer and the dielectric layer being only several nm, field emission occurs between the field-emission layer and the dielectric layer. In this way, it is possible to obtain a greater amount of electric charges at a surface of the electrode contacting the field-emission layer.

As described, a small amount of electric charges are trapped in a surface of a dielectric layer, which contacts an electrode, in a conventional luminescent device. However, if the electrode is coated with carbon nano tubes as suggested by embodiments of the present invention, it is possible to trap a large amount of electric charges in a surface of a dielectric layer regardless of the electrical characteristics of the dielectric layer.

EXPERIMENTAL EXAMPLE

Figure 6:
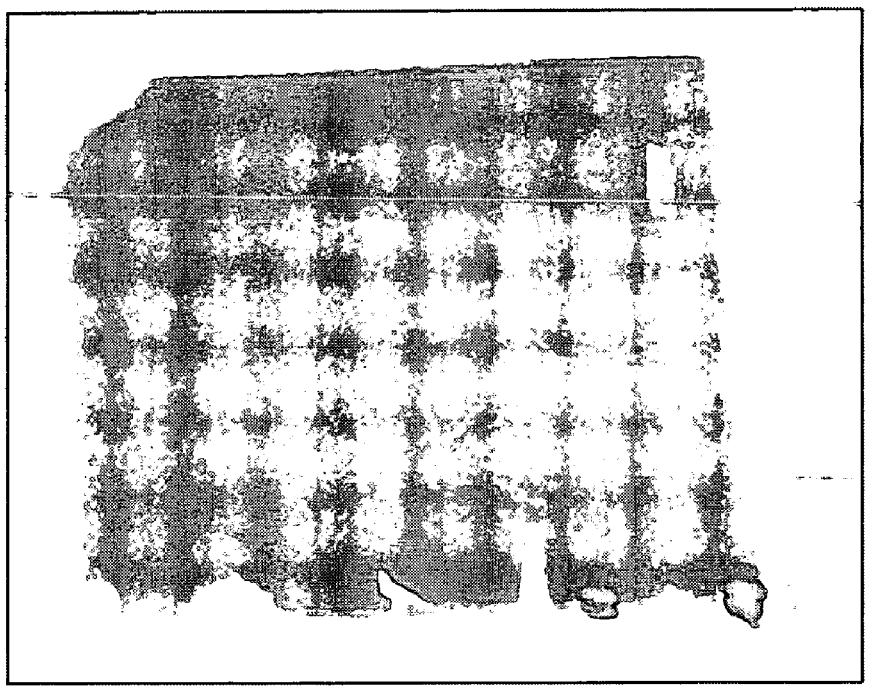
FIGS. 6 and 7 are photographs showing radiation emitted from luminous structures according to the present invention.

FIG. 6 is a photograph showing radiation emitted from an electroluminescent device according to an embodiment of the present invention. Referring to FIG. 6, a Ni catalyst was applied onto a chrome electrode using sputtering. Next, an electric field enhancing layer was formed of carbon nano tubes and attached to a substrate using chemical vapor deposition (CVD). Next, a transparent electrode and a fluorescent layer were sequentially formed on another substrate. Then, the two substrates were separated from each other using a glass plate having a thickness of 0.2 mm, an AC voltage of 800 V with a pulse of 30 kHz was applied to the resultant structure to generate the radiation shown in FIG. 6.

Figure 7:
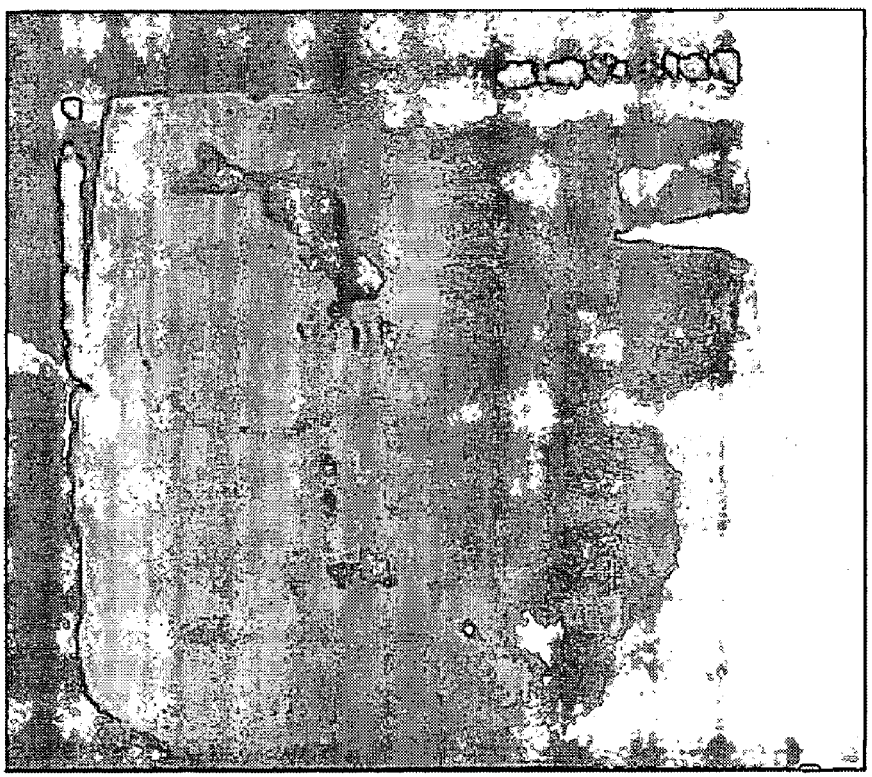

FIG. 7 is a photograph showing radiation emitted from an electroluminescent device according to an embodiment of the present invention, in which substrates the same as those described above were separated from each other using an aluminum substrate having a thickness of 0.2 mm, and an AC voltage of 800 V with a pulse of 30 kHz was applied to the resultant structure. Particles of aluminum used as an insulating layer can be seen in FIG. 7.

Figure 8:
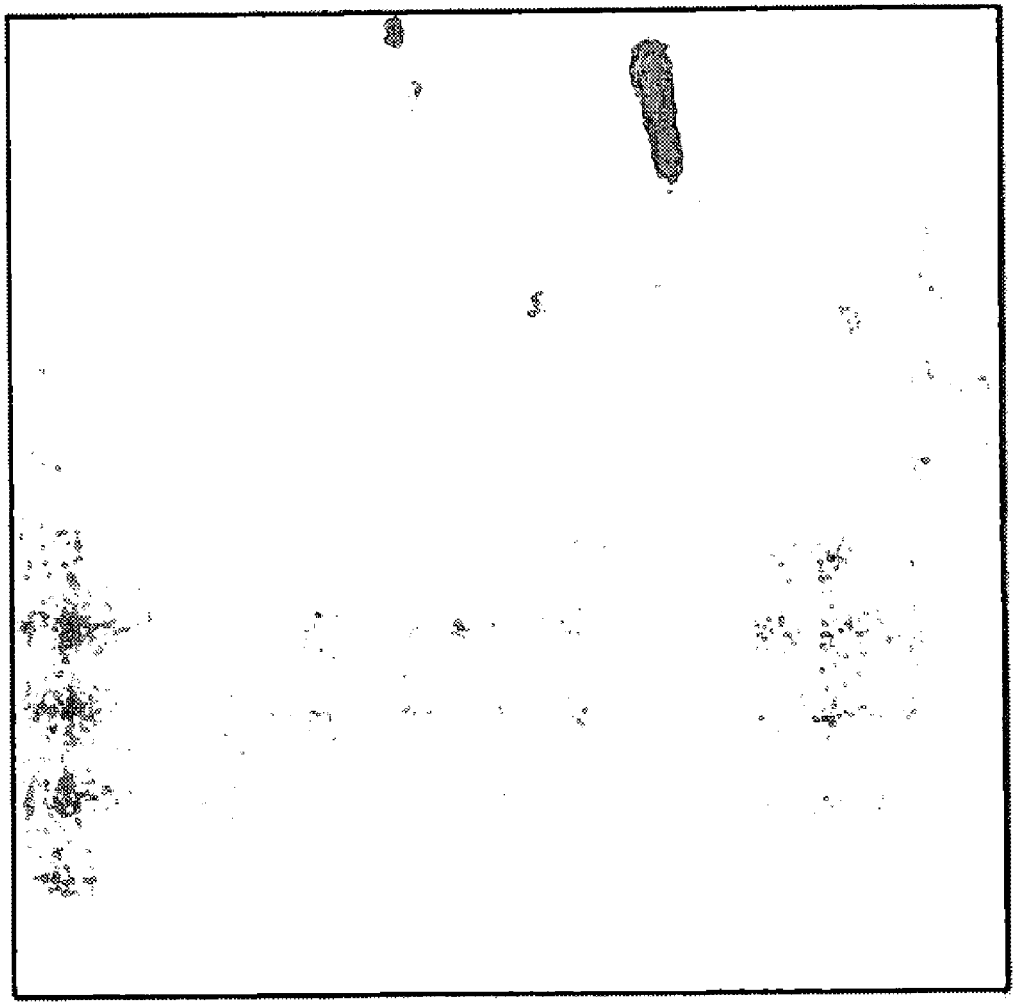
FIG. 8 is a photograph showing radiation emitted from a conventional luminous structure.

FIG. 8 is a photograph showing radiation emitted from a conventional electroluminescent device, in which a substrate including an electrode, which does not include a field-emission layer, was separated from another substrate which includes a transparent electrode coated with a fluorescent layer, using a glass plate having a thickness of 0.2 mm, and an AC voltage of 1,100 V with a pulse of 30 kHz was applied to the resultant structure.

The electroluminescent devices according to the present invention radiated brightly as shown in FIGS. 6 and 7, whereas the conventional electroluminescent device did not radiate as shown in FIG. 8.

The above experiments show that luminous efficiency is largely increased when an electroluminescent device includes an electric field enhancing layer. If an electric field enhancing layer according to embodiments of the present invention is formed on an electrode contacting a dielectric layer, electric field enhancement can be obtained with a lower driving voltage. In addition, driving voltage for driving an electroluminescent device can be lowered by appropriately selecting a material for an insulating layer and reducing the thickness thereof.

Such an electroluminescent device according to embodiments of the present invention can operate in a lower vacuum state with lower voltage than the conventional art, thereby increasing the life span of the device and decreasing the cost of manufacturing a conventionally costly driving circuit.

While this invention has been particularly shown and described with reference to preferred embodiments thereof, it will be understood by those skilled in the art that various changes in form and details may be made therein without departing from the spirit and scope of the invention as defined by the appended claims.

What is claimed is:
1. An inorganic electroluminescent device comprising:
a substrate;
a transparent electrode located on one surface of the substrate;
an inorganic light-emitting layer located on a side of the electrode opposite to the substrate;
a dielectric layer located on a side of the inorganic light-emitting layer opposite to the electrode;
an electron field emission enhancing layer, located on a side of the dielectric layer opposite to the inorganic light emitting layer, that enhances emission of electrons located at an interface between the dielectric layer and the inorganic light emitting layer; and
a back electrode located on a side of electric field emission enhancing layer opposite to the dielectric layer,
wherein the electron field emission enhancing layer includes (i) carbon nano tubes, or (ii) nano particles.
2. An inorganic electroluminescent device comprising:
a first electrode;
a first dielectric layer adjacent to the first electrode;
an inorganic light-emitting layer adjacent to the first dielectric layer;

a second dielectric layer adjacent the inorganic light-emitting layer;

a second electrode adjacent the second dielectric layer, wherein the first electrode, first dielectric layer, the inorganic light-emitting layer, the second dielectric layer and the second electrode form a layered structure; and a substrate adjacent the layered structure, wherein the layered structure includes an electron field emission enhancing layer for enhancing emission of electrons located at an interface between an electrode and a dielectric layer located at least one location selected from the list of a location between the first electrode and the first dielectric layer, and a location between the second electrode and the second dielectric layer, wherein the electron field enhancing layer includes (i) carbon nano tubes, or (ii) nano particles.

3. An inorganic electroluminescent device comprising:

first and second substrates which are arranged opposite to each other;

a transparent electrode located on the first substrate;

an inorganic light-emitting layer located on the transparent layer;

a dielectric layer located on the light-emitting layer;

a back electrode located on the second substrate; and an electron field emission enhancing layer, located on the back electrode and is in contact with the dielectric layer on the first substrate, that enhances emission of electrons located at an interface of the back electrode and the dielectric layer, wherein the electron field emission enhancing layer includes (i) carbon nano tubes, or (ii) nano particles.

4. An inorganic electroluminescent layer comprising:

first and second substrates which are arranged opposite to each other;

a transparent electrode located adjacent the first substrate;

a first electron field emission enhancing layer, located adjacent the transparent electrode, that enhances emission of electrons located at an interface between the transparent electrode and a first dielectric layer;

the first dielectric layer located adjacent the transparent electrode;

an inorganic light-emitting layer located adjacent to the first dielectric layer;

a second electron field emission enhancing layer located adjacent the inorganic light-emitting layer, that enhances emission of electrons located at an interface between the inorganic light-emitting layer and a back electrode;

the back electrode located adjacent the second electron field emission enhancing layer; and a second dielectric layer located adjacent the back electrode, wherein at least one of the first and the second electron field emission enhancing layer includes (i) carbon nano tubes, or (ii) nano particles.

5. The device of claim 4, wherein the transparent electrode, the first electron field emission enhancing layer, the first dielectric layer, the inorganic light-emitting layer, and the second dielectric layer are formed on the first substrate, and the back electrode and the second electron field emission enhancing layer are formed on the second substrate.

* * * * *